US008843109B2

(12) United States Patent
Hamada

(10) Patent No.: US 8,843,109 B2
(45) Date of Patent: Sep. 23, 2014

(54) DEVICE WITH A COMMUNICATION MODULE THAT PERFORMS WIRELESS COMMUNICATION USING UNIQUE INFORMATION, METHOD FOR CONTROLLING THE DEVICE, AND COMPUTER-READABLE RECORDING MEDIUM HAVING PROGRAM FOR CONTROLLING THE DEVICE RECORDED THEREON

(71) Applicant: Fujitsu Limited, Kawasaki (JP)

(72) Inventor: Kiyoshi Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/799,407

(22) Filed: Mar. 13, 2013

(65) Prior Publication Data

US 2013/0189950 A1 Jul. 25, 2013

Related U.S. Application Data

(63) Continuation of application No. PCT/JP2010/065982, filed on Sep. 15, 2010.

(51) Int. Cl.
| | |
|---|---|
| *H04M 1/66* | (2006.01) |
| *H04M 1/68* | (2006.01) |
| *H04M 3/16* | (2006.01) |
| *H04B 1/38* | (2006.01) |
| *H04L 9/32* | (2006.01) |
| *H04W 12/12* | (2009.01) |
| *G06F 21/57* | (2013.01) |
| *H04W 12/06* | (2009.01) |
| *G06F 21/30* | (2013.01) |
| *G06F 21/35* | (2013.01) |
| *G06F 21/34* | (2013.01) |
| *H04W 8/18* | (2009.01) |

(52) U.S. Cl.
CPC ............ *H04B 1/3816* (2013.01); *H04L 9/3234* (2013.01); *H04L 2209/80* (2013.01); *H04W 12/12* (2013.01); *G06F 21/575* (2013.01); *H04W 8/183* (2013.01); *H04W 12/06* (2013.01); *G06F 21/305* (2013.01); *H04L 9/3226* (2013.01); *G06F 21/35* (2013.01); *G06F 21/34* (2013.01)

USPC ............ 455/410; 455/411; 455/435.1; 726/2

(58) Field of Classification Search
CPC ...... H04B 1/3816; G06F 21/305; G06F 21/34; G06F 21/35; G06F 21/575; H04W 8/183; H04W 12/12; H04W 12/06; H04L 9/3234; H04L 9/3226
USPC ........ 455/403, 410, 411, 435.1–435.3, 422.1; 379/189, 161, 168, 184, 194; 726/1–5, 726/9, 16, 17, 21, 26–29; 380/247–250
See application file for complete search history.

(56) References Cited

U.S. PATENT DOCUMENTS

| | | | | |
|---|---|---|---|---|
| 7,042,595 | B2 * | 5/2006 | Mitani | 358/402 |
| 7,444,476 | B2 * | 10/2008 | Gnanasabapathy et al. | 711/141 |
| 7,761,717 | B2 * | 7/2010 | Moller et al. | 713/189 |
| 2003/0200445 | A1 | 10/2003 | Park | |
| 2007/0046805 | A1 * | 3/2007 | Nakanishi | 348/333.01 |

FOREIGN PATENT DOCUMENTS

| | | |
|---|---|---|
| JP | 2003-316467 | 11/2003 |
| JP | 2005-86253 | 3/2005 |

OTHER PUBLICATIONS

International Search Report, dated Oct. 19, 2010, in corresponding International Application No. PCT/JP2010/065982 (4 pp.).
Written Opinion of the International Searching Authority, dated Oct. 19, 2010, in corresponding International Application No. PCT/JP2010/065982 (3 pp.).

* cited by examiner

*Primary Examiner* — Ajit Patel
(74) *Attorney, Agent, or Firm* — Staas & Halsey LLP

(57) ABSTRACT

An information processing device includes: a communication module that performs wireless communication with another device using unique information included in an electronic card; an acquiring unit that acquires the unique information included in the electronic card; a registering unit that registers the unique information acquired by the acquiring unit in a first memory unit and a second memory unit that is provided in the communication module; a deciding unit that decides whether or not the unique information registered in the first memory unit matches the unique information registered in the second memory unit and the unique information included in the electronic card, respectively; and an activation controlling unit that allows activation of the information processing device when the deciding unit decides that the unique information registered in the first memory unit matches the unique information registered in the second memory unit and the unique information included in the electronic card.

8 Claims, 7 Drawing Sheets

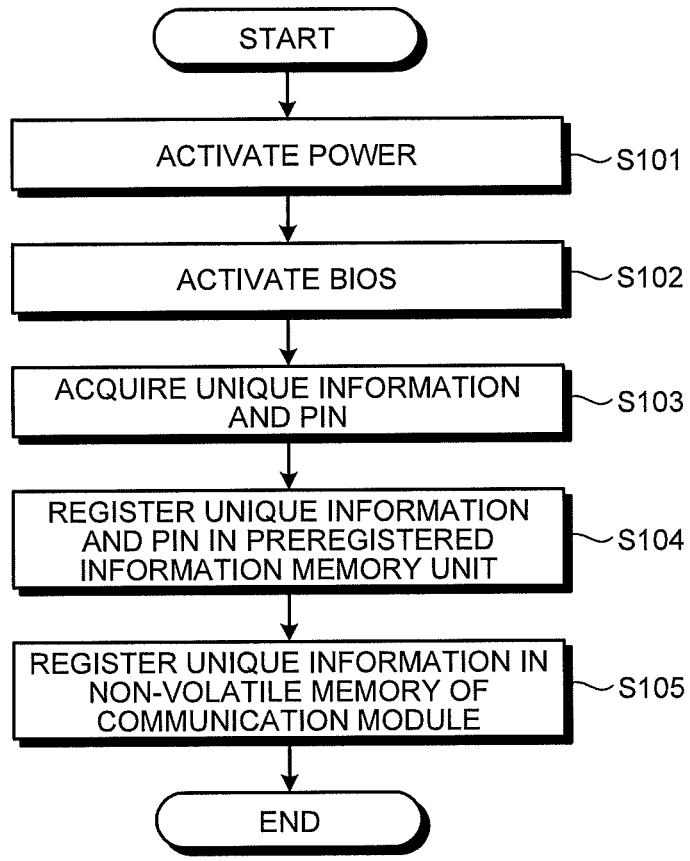

COMMUNICATION MODULE HAS BEEN CHANGED.
PERSONAL COMPUTER IS SHUT DOWN.

REGISTERED SIM CARD IS NOT CONFIRMED.
PERSONAL COMPUTER IS SHUT DOWN.

FIG.9

```
COMMUNICATION MODULE HAS BEEN CHANGED.
DATA IN HARD DISK IS ERASED.
```
M3

FIG.10

```
REGISTERED SIM CARD IS NOT CONFIRMED.
DATA IN HARD DISK IS ERASED.
```
M4

DEVICE WITH A COMMUNICATION MODULE THAT PERFORMS WIRELESS COMMUNICATION USING UNIQUE INFORMATION, METHOD FOR CONTROLLING THE DEVICE, AND COMPUTER-READABLE RECORDING MEDIUM HAVING PROGRAM FOR CONTROLLING THE DEVICE RECORDED THEREON

CROSS-REFERENCE TO RELATED APPLICATION

This application is a continuation application of International Application PCT/JP2010/065982, filed on Sep. 15, 2010, and designating the U.S., the entire contents of which are incorporated herein by reference.

FIELD

The present invention relates to an information processing device, an information processing device controlling method, an information processing device controlling program, and a computer-readable recording medium having the information processing device controlling program recorded thereon.

BACKGROUND

In recent years, information processing devices to which SIM (Subscriber Identity Module) cards including unique information uniquely allocated to users are mounted and which have communication modules which perform wireless communication with other devices using the unique information read from the SIM cards are spreading. The other devices perform remote management of, for example, stopping activation of the information processing devices using wireless communication performed by the communication modules, and erasing data.

However, when remote management is performed using wireless communication performed by a communication module, if a SIM card is exchanged, unique information included in the exchanged SIM card becomes different from the original unique information, and therefore the module communication is not capable of performing wireless communication. Then, the information processing device goes outside remote control by another terminal device, and has a risk that a malicious third party misuses the information processing device and information stored in the information processing device leaks.

Recently, a method of controlling an information processing device which uses unique information included in a SIM card as a password for activating the device is known as a countermeasure for misuse outside remote management. According to this controlling method, the unique information included in the SIM card is registered in advance in a memory unit inside the information processing device, and whether or not unique information registered in advance when power is activated and unique information read from the SIM card mounted to the device match is decided. Further, when it is decided that both of the pieces of unique information match, the device is activated assuming that the valid SIM card is mounted, and, when it is decided that both of the pieces of unique information do not match, the device is not activated assuming that the valid SIM card is exchanged to an invalid SIM card.

Patent Literature 1: Japanese Laid-open Patent Publication No. 2003-316467

SUMMARY

However, the above conventional technique has a problem that misuse is conducted outside remote management when a communication module is exchanged.

More specifically, according to the conventional technique, after unique information registered in advance and unique information read from a SIM card mounted to the device match and a device is activated, a communication module is exchanged to an invalid communication module which is forbidden to perform wireless communication with another device in some cases. In this case, the information processing device goes outside remote management by another device, and therefore there is a concern that a malicious third party misuses the information processing device and steals information stored in the device.

An information processing device includes a communication module that performs wireless communication with another device using unique information included in an electronic card; an acquiring unit that acquires the unique information included in the electronic card; a registering unit that registers the unique information acquired by the acquiring unit in a first memory unit and a second memory unit that is provided in the communication module; a deciding unit that decides whether or not the unique information registered in the first memory unit matches the unique information registered in the second memory unit and the unique information included in the electronic card, respectively; and an activation controlling unit that allows activation of the information processing device when the deciding unit decides that the unique information registered in the first memory unit matches the unique information registered in the second memory unit and the unique information included in the electronic card, respectively The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view illustrating an example of a preregistered information memory unit.

FIG. 4 is a flowchart illustrating procedure of preregistration processing by the information processing device according to the present embodiment.

FIG. 9 is a view illustrating an example of an error screen (part 3).

FIG. 10 is a view illustrating an example of an error screen (part 4).

DESCRIPTION OF EMBODIMENT

An embodiment of an information processing device, an information processing device controlling method, an information processing device controlling program and a computer-readable recording medium having the information processing device controlling program recorded thereon disclosed in the present application will be described below in detail based on the drawings.

First Embodiment

Figure 1:
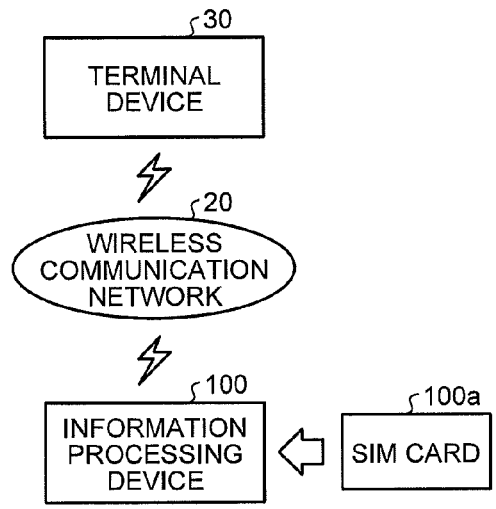
FIG. 1 is a view illustrating a configuration example of a communication system including an information processing device according to a present embodiment.

First, a configuration example of a communication system including an information processing device according to the present embodiment will be described with reference to FIG. 1. FIG. 1 is a view illustrating the configuration example of the communication system including an information processing device 100 according to the present embodiment. As illustrated in FIG. 1, the communication system according to the present embodiment has the information processing device 100, a wireless communication network 20 and a terminal device 30.

The information processing device 100 performs wireless communication with another terminal device through the wireless communication network. For example, the information processing device 100 accesses the wireless communication network 20 using unique information read from a SIM (Subscriber Identity Module) card 100a mounted to a card slot, and performs wireless communication with, for example, the another terminal device 30 through the accessed wireless communication network 20.

The SIM card 100a is a detachable IC (Integrated Circuit) card which stores unique information (for example, IMSI (International Mobile Subscriber Identity)) uniquely allocated to a user to access a wireless communication network provided by a service provider with who the user made a contract.

The terminal device 30 performs remote management of the information processing device 100 using wireless communication performed by the information processing device 100 through the wireless communication network 20. For example, as remote management, the terminal device 30 remotely stops activation of the information processing device 100 or remotely erases data stored inside the information processing device 100.

Figure 2:
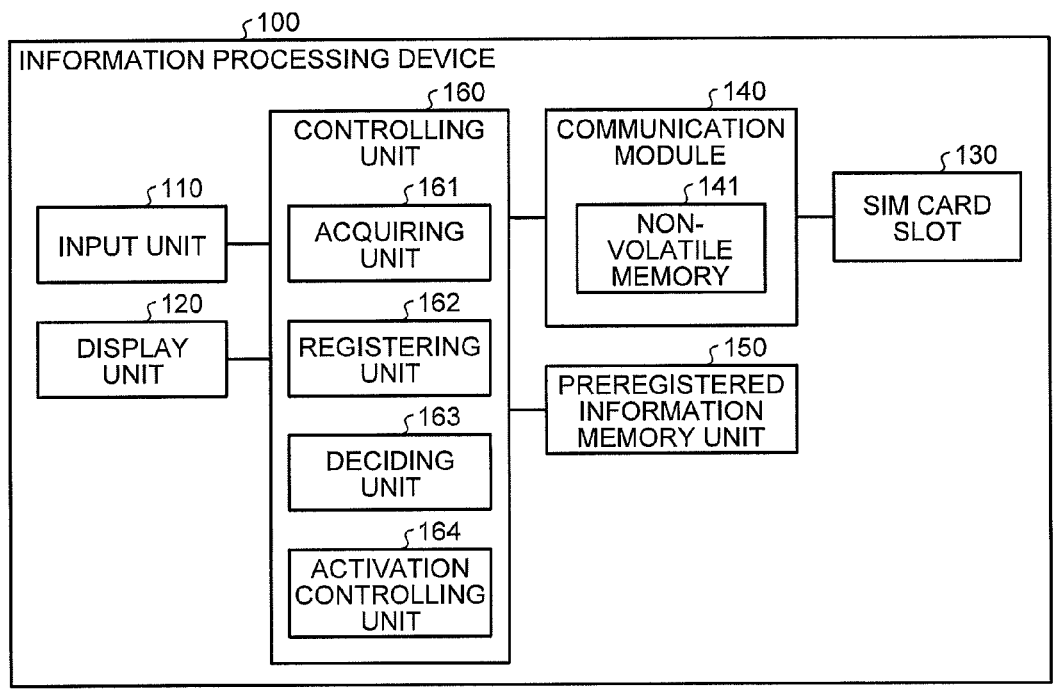
FIG. 2 is a block diagram illustrating a configuration of the information processing device according to the present embodiment.

Next, a configuration of the information processing device 100 illustrated in FIG. 1 will be described with reference to FIG. 2. FIG. 2 is a block diagram illustrating the configuration of the information processing device 100 according to the present embodiment. As illustrated in FIG. 2, the information processing device 100 according to the present embodiment has an input unit 110, a display unit 120, a SIM card slot 130, a communication module 140, a preregistered information memory unit 150 and a controlling unit 160.

The input unit 110 is input means which inputs various pieces of information, and includes, for example, a keyboard, a mouse, a microphone and a mask. The display unit 120 is output means which outputs various pieces of information, and includes, for example, a monitor and a speaker.

The SIM card slot 130 is a slot to which a SIM card can be attached and detached, and is connected to the communication module 140. When the SIM card is mounted, the SIM card slot 130 reads unique information included in the SIM card and passes the unique information to the communication module 140. When a PIN (Personal Identification Number) which is a security code is set to the SIM card, the SIM card slot 130 passes a request of inputting the PIN (referred to as "PIN input request" below) to the communication module 140.

The communication module 140 is a module which performs wireless communication with another device using the received unique information when receiving the unique information included in the SIM card from the SIM card slot 130. When, for example, receiving the IMSI as unique information included in the SIM card, the communication module 140 accesses the wireless communication network 20 illustrated in FIG. 1 using the IMSI and performs wireless communication with, for example, the another terminal device 30 through the accessed wireless communication network 20.

Further, when receiving the PIN input request from the SIM card slot 130, the communication module 140 passes the received PIN input request to the controlling unit 160.

Further, the communication module 140 is provided with a non-volatile memory 141 such as a flash memory. The non-volatile memory 141 stores unique information included in the SIM card. The unique information stored in the non-volatile memory 141 is registered by a registering unit 162 of the controlling unit 160 described below. The non-volatile memory 141 is an example of a second memory unit.

Further, the communication module 140 generally adopts a structure which is removable from the information processing device 100. For example, the communication module 140 is removably connected to the controlling unit 160 through a predetermined cable, and can be removed by being detached from the cable when a cover of a housing of the information processing device 100 is opened.

The preregistered information memory unit 150 stores in advance preregistered information related to a SIM card to be mounted. This preregistered information memory unit 150 is constructed using a storage device such as a hard disk drive (HDD), a BIOS-ROM (Basic Input Output System-Read Only Memory) or a TPM (Trusted Platform Module). FIG. 3 is a view illustrating an example of the preregistered information memory unit 150. As illustrated in FIG. 3, the preregistered information memory unit 150 stores a PIN and unique information in association with user information as preregistered information. In addition, the preregistered information stored in the preregistered information memory unit 150 is registered by the registering unit 162 of the controlling unit 160. The preregistered information memory unit 150 is an example of a first memory unit.

User information is identification information for identifying a user who uses the information processing device 100. In the present embodiment, user information is, for example, user name "user name" of the user who uses the information processing device 100. A PIN is a passcode (security code) for accessing a SIM card. In the present embodiment, the PIN is, for example, a four-digit number "1234". Unique information is information uniquely allocated to the user to access a wireless communication network of a service provider with who the user made a contract, and is stored in the SIM card. In the present embodiment, the unique information is, for example, a 15-digit number "123121234567890" which is referred to as an "IMSI".

The controlling unit 160 is a processing unit which entirely controls the information processing device 100, and has an acquiring unit 161, the registering unit 162, a deciding unit 163 and activation controlling unit 164.

The acquiring unit 161 acquires various pieces of information included in the SIM card, and passes the various pieces of information to the registering unit 162. For example, when the controlling unit 160 activates the BIOS (Basic Input Output System), the acquiring unit 161 has the display unit 120 display a screen for requesting an input of unique information included in the SIM card and the PIN set to the SIM card. Further, the acquiring unit 161 acquires the unique information and the PIN inputted to the screen, and passes the acquired unique information and PIN to the registering unit 162. In this case, the acquiring unit 161 passes a user name received from the user during user authentication processing executed by the BIOS, as user information to the registering unit 162 together with the unique information and the PIN.

The registering unit 162 registers the various pieces of information of the SIM card acquired by the acquiring unit 161, in the preregistered information memory unit 150 and the non-volatile memory 141 of the communication module 140. More specifically, when receiving the user information, the unique information and the PIN from the acquiring unit 161, the registering unit 162 registers the PIN and the unique information as preregistered information in the preregistered information memory unit 150 in association with the user information. Further, the registering unit 162 encrypts the unique information received from the acquiring unit 161, sends the unique information to the communication module 140 and registers the unique information in the non-volatile memory 141 of the communication module 140.

The deciding unit 163 performs authentication processing using the unique information and the PIN registered in the preregistered information memory unit 150, the unique information registered in the non-volatile memory 141 of the communication module 140 and the unique information and the PIN included in the mounted SIM card.

More specifically, when authentication of the user succeeds as a result that the BIOS executes the user authentication processing, the deciding unit 163 reads the unique information from the non-volatile memory 141 of the communication module 140. Further, the deciding unit 163 compares the read unique information and the unique information registered in the preregistered information memory unit 150 and, when both of pieces of unique information match, accesses the mounted SIM card through the communication module 140.

Furthermore, when receiving the PIN input request from the SIM card through the communication module 140, the deciding unit 163 inputs the PIN registered in the preregistered information memory unit 150, to the SIM card through the communication module 140. Still further, the deciding unit 163 compares the PIN registered in the preregistered information memory unit 150 and the PIN set to the mounted SIM card and, when both of the PINs match, reads the unique information from the mounted SIM card. Moreover, the deciding unit 163 compares the read unique information and the unique information registered in the preregistered information memory unit 150, and, when both pieces of unique information match, notifies that authentication of the communication module 140 and the mounted SIM card succeeded, to the activation controlling unit 164.

Meanwhile, the deciding unit 163 compares the unique information read from the non-volatile memory 141 and the unique information registered in the preregistered information memory unit 150, and, when both of pieces of unique information do not match, notifies that authentication of the communication module 140 failed, to the activation controlling unit 164. Further, the deciding unit 163 compares the PIN registered in the preregistered information memory unit 150 and the PIN set to the mounted SIM card, and, when both of the PINs do not match, notifies that authentication of the mounted SIM card failed, to the activation controlling unit 164. Furthermore, the deciding unit 163 compares the unique information read from the mounted SIM card and the unique information registered in the preregistered information memory unit 150, and, when both of pieces of unique information do not match, notifies that authentication of the mounted SIM card failed, to the activation controlling unit 164.

The activation controlling unit 164 is a controlling unit which controls activation of the information processing device according to an authentication result of the deciding unit 163. More specifically, when receiving from the deciding unit 163 a notice that authentication succeeded, the activation controlling unit 164 allows activation of an OS (Operating System). Meanwhile, when receiving from the deciding unit 163 a notice that authentication failed, the activation controlling unit 164 disallows activation of the OS and displays an error screen indicating this failure on the display unit 120.

In addition, when receiving from the deciding unit 163 a notice that authentication failed, the activation controlling unit 164 erases data stored in the hard disk (or invalidates an encryption key for accessing the hard disk), and displays an error screen indicating that the data is erased, on the display unit 120.

Next, procedure of preregistration processing by the information processing device 100 according to the present embodiment will be described with reference to FIG. 4. FIG. 4 is a flowchart illustrating the procedure of the preregistration processing by the information processing device 100 according to the present embodiment.

Figure 5:
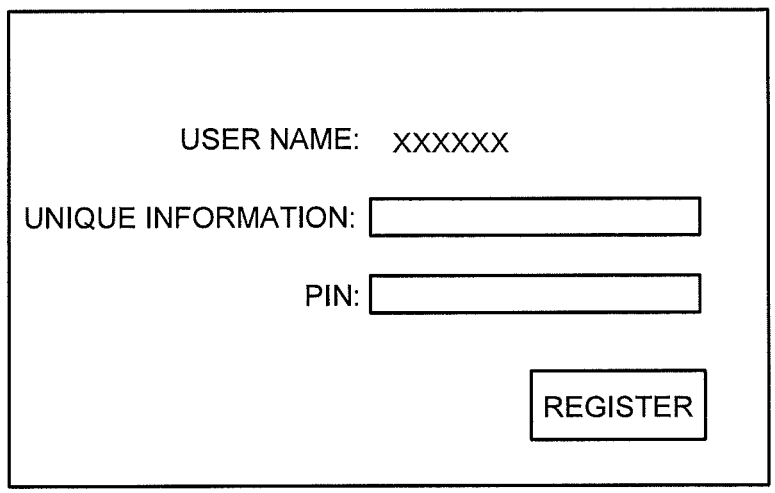
FIG. 5 is a view illustrating an example of an input request screen.

As illustrated in FIG. 4, when power is activated in the information processing device 100 (step S101), the controlling unit 160 activates the BIOS (step S102). Further, the acquiring unit 161 of the controlling unit 160 has the display unit 120 display a screen (referred to as "input request screen" below) for requesting an input of the unique information included in the SIM card and the PIN set to the SIM card. FIG. 5 is a view illustrating an example of the input request screen.

Further, when the unique information and the PIN are inputted to the input request screen and "register" is clicked, the acquiring unit 161 acquires the inputted unique information and PIN (step S103). Furthermore, the acquiring unit 161 passes the acquired unique information and PIN to the registering unit 162. In this case, the acquiring unit 161 passes a user name received from the user during user authentication processing executed by the BIOS, as user information to the registering unit 162 together with the unique information and the PIN.

Subsequently, when receiving the user information, the unique information and the PIN from the acquiring unit 161, the registering unit 162 registers the PIN, the unique information as preregistered information in the preregistered information memory unit 150 in association with the user information (step S104). Further, the registering unit 162 encrypts the unique information received from the acquiring unit 161, sends the unique information to the communication module 140 and registers the unique information in the non-volatile memory 141 of the communication module 140 (step S105).

Thus, the registering unit 162 registers the unique information of the SIM card in the preregistered information memory unit 150 and the non-volatile memory 141 of the communication module 140, so that it is possible to use the unique information of the SIM card as a password for authentication processing of the communication module 140.

Figure 6:
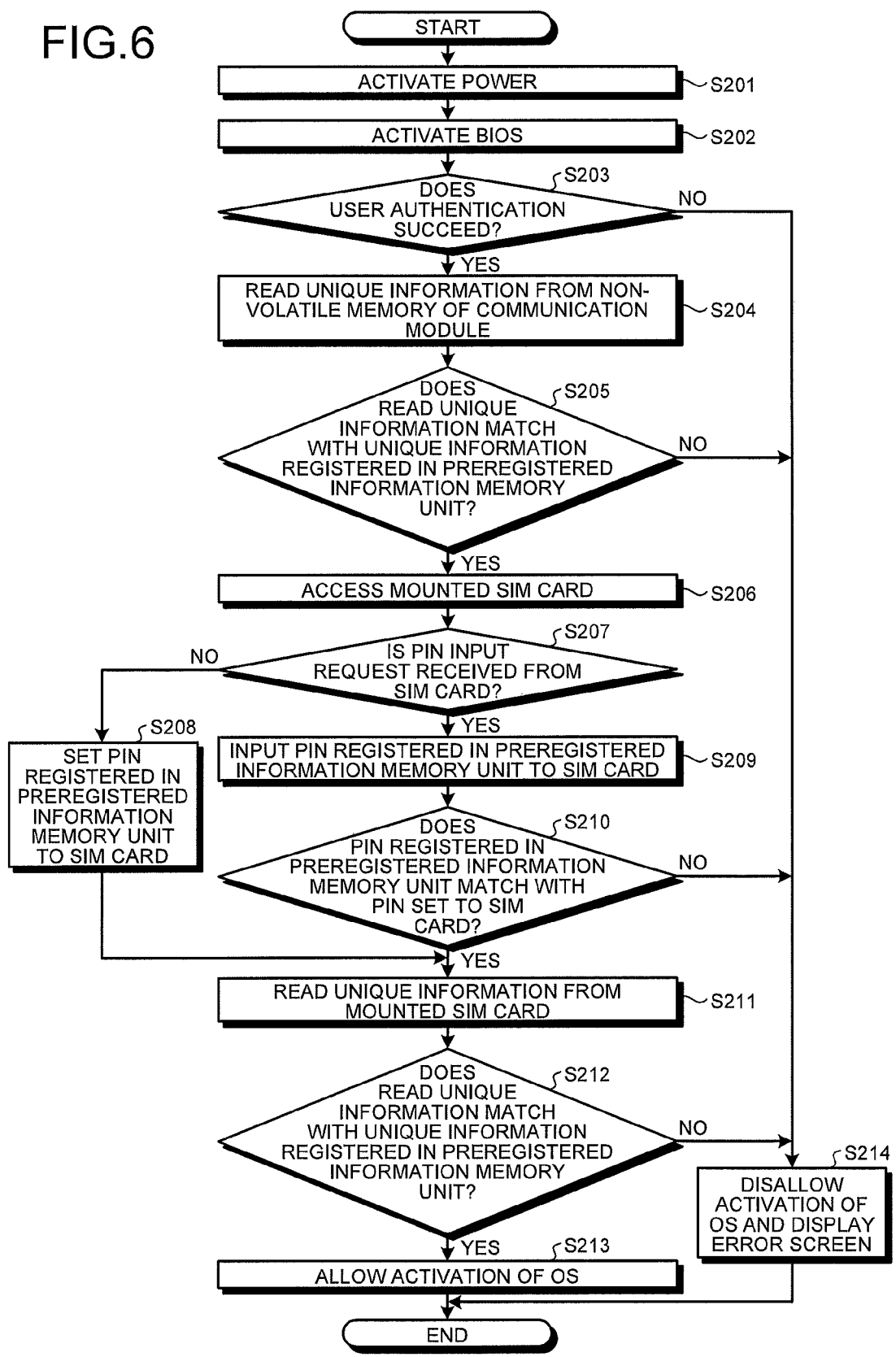
FIG. 6 is a flowchart illustrating procedure of activation processing by the information processing device according to the present embodiment.

Next, procedure of activation processing by the information processing device 100 according to the present embodiment will be described with reference to FIG. 6. FIG. 6 is a flowchart illustrating the procedure of the activation processing by the information processing device 100 according to the present embodiment.

As illustrated in FIG. 6, when power is activated in the information processing device 100 (step S201), the controlling unit 160 activates the BIOS (step S202). Further, the BIOS executes user authentication processing using a user name and a password or user authentication processing which combines various pieces of biometric information such as finger prints and veins with a user name and a password.

Furthermore, when authentication of the user succeeded (step S203: Yes), the deciding unit 163 of the controlling unit 160 reads the unique information from the non-volatile memory 141 of the communication module 140 (step S204). Meanwhile, when authentication of the user failed (step S203: No), the deciding unit 163 notifies that authentication of the user failed, to the activation controlling unit 164 and advances processing to step S214.

Subsequently, the deciding unit 163 compares the unique information read from the non-volatile memory 141 of the communication module 140 and the unique information registered in the preregistered information memory unit 150, and decides whether or not both of pieces of unique information match (step S205). When the unique information read from the non-volatile memory 141 and the unique information registered in the preregistered information memory unit 150 do not match (step S205: No), the deciding unit 163 notifies that authentication of the communication module 140 failed, to the activation controlling unit 164 and advances processing to step S214. Meanwhile, when the unique information read from the non-volatile memory 141 and the unique information registered in the preregistered information memory unit 150 match (step S205: Yes), the deciding unit 163 accesses the mounted SIM card through the communication module 140 (step S206).

Subsequently, when not receiving the PIN input request from the SIM card (step S207: No), the deciding unit 163 sets to the SIM card the PIN registered in the preregistered information memory unit 150 (step S208) and advances processing to step S211.

Meanwhile, when receiving the PIN input request from the SIM card (step S207: Yes), the deciding unit 163 inputs to the SIM card the PIN registered in the preregistered information memory unit 150 (step S209). Subsequently, the deciding unit 163 compares the PIN registered in the preregistered information memory unit 150 and the PIN set to the mounted SIM card, and decides whether or not both of the PINs match (step S210). When the PIN registered in the preregistered information memory unit 150 and the PIN set to the mounted SIM card do not match (step S210: No), the deciding unit 163 notifies that authentication of the mounted SIM card failed, to the activation controlling unit 164 and advances processing to step S214.

Meanwhile, when the PIN registered in the preregistered information memory unit 150 and the PIN set to the mounted SIM card match (step S210: Yes), the deciding unit 163 reads the unique information from the mounted SIM card (step S211). Subsequently, the deciding unit 163 compares the unique information read from the SIM card and the unique information registered in the preregistered information memory unit 150, and decides whether both of pieces of unique information match (step S212). When the unique information read from the SIM card and the unique information registered in the preregistered information memory unit 150 do not match (step S212: No), the deciding unit 163 notifies that authentication of the mounted SIM card failed, to the activation controlling unit 164 and advances processing to step S214.

Meanwhile, when the unique information read from the SIM card and the unique information registered in the preregistered information memory unit 150 match (step S212: Yes), the deciding unit 163 notifies that authentication of the communication module 140 and the mounted SIM card succeeded, to the activation controlling unit 164. Subsequently, when receiving from the deciding unit 163 a notice that authentication succeeded, the activation controlling unit 164 allows activation of the OS (step S213).

Further, in step S214, when receiving from the deciding unit 163 a notice that authentication failed, the activation controlling unit 164 disallows activation of the OS and displays an error screen indicating that activation of the OS is disallowed, on the display unit 120 (step S214).

Figure 7:
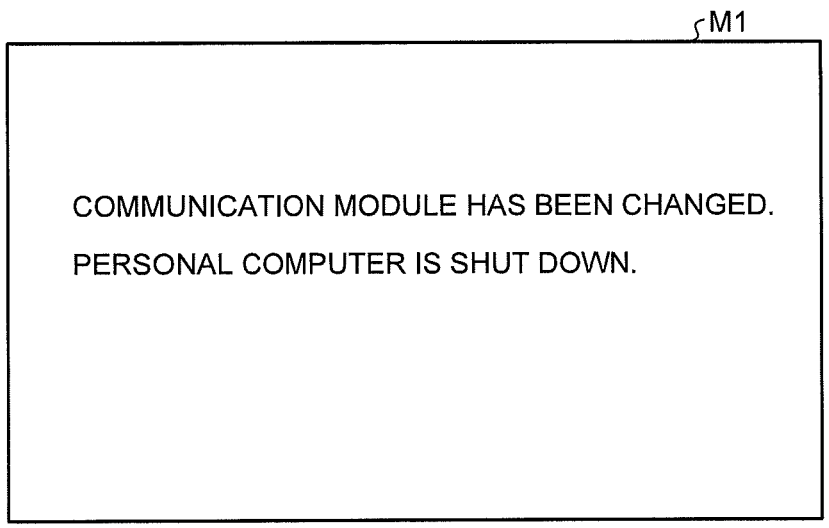
FIG. 7 is a view illustrating an example of an error screen (part 1).

FIG. 7 is a view illustrating an example of an error screen (part 1). As described in step S205 in FIG. 6, when the unique information read from the non-volatile memory 141 and the unique information registered in the preregistered information memory unit 150 do not match, the deciding unit 163 notifies that authentication of the communication module 140 failed, to the activation controlling unit 164. As illustrated in FIG. 7, the activation controlling unit 164 which received the notice that the authentication of the communication module 140 failed disallows activation of the OS, and displays an error screen M1 indicating that shutdown is performed, on the display unit 120.

Figure 8:
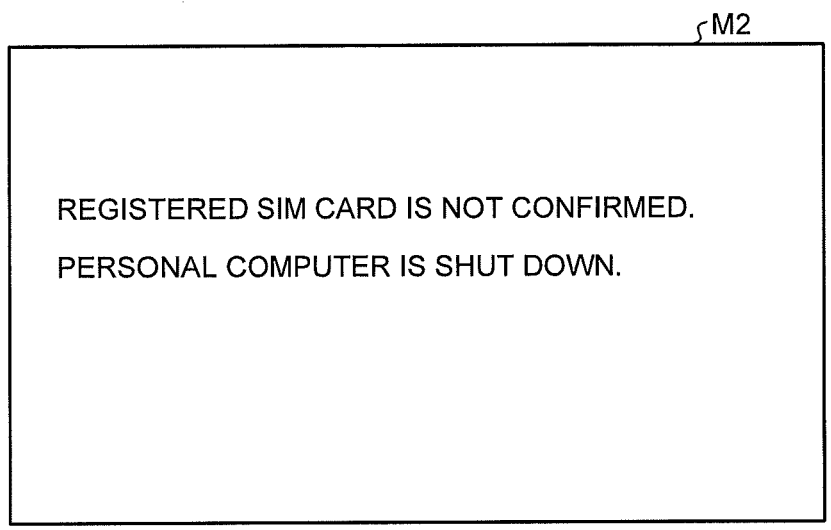
FIG. 8 is a view illustrating an example of an error screen (part 2).

FIG. 8 is a view illustrating an example of an error screen (part 2). As described in step S210 in FIG. 6, when the PIN registered in the preregistered information memory unit 150 and the PIN set to the mounted SIM card do not match, the deciding unit 163 notifies that authentication of the mounted SIM card failed, to the activation controlling unit 164. Further, as described in step S212 in FIG. 6, when the unique information read from the SIM card and the unique information registered in the preregistered information memory unit 150 do not match, the deciding unit 163 notifies that authentication of the mounted SIM card failed, to the activation controlling unit 164. As illustrated in FIG. 8, the activation controlling unit 164 which received the notice that authentication of the mounted SIM card failed disallows activation of the OS, and displays an error screen M2 indicating that shutdown is performed, on the display unit 120.

Further, a case has been described with above step S214 where, when receiving from the deciding unit 163 a notice that authentication failed, the activation controlling unit 164 disallows activation of the OS and displays an error screen indicating that activation of the OS is disallowed, on the display unit 120. However, as illustrated in FIGS. 9 and 10, when receiving from the deciding unit 163 a notice that authentication failed, the activation controlling unit 164 may erase data stored in the hard disk, and display an error screen indicating that data is erased, on the display unit 120.

FIG. 9 is a view illustrating an example of an error screen (part 3). As illustrated in FIG. 9, the activation controlling unit 164 which received the notice that authentication of the communication module 140 failed displays an error screen M3 indicating that data stored in the hard disk is erased, on the display unit 120.

FIG. 10 is a view illustrating an example of an error screen (part 4). As illustrated in FIG. 10, the activation controlling unit 164 which received the notice that authentication of the mounted SIM card failed displays an error screen M4 indicating that data stored in the hard disk is erased, on the display unit 120.

As described above, the information processing device 100 according to the present embodiment registers unique information included in the SIM card, in advance in the preregistered information memory unit 150 and the non-volatile memory 141 of the communication module 140. Further, the information processing device 100 allows activation of the information processing device when the unique information registered in the preregistered information memory unit 150, the unique information registered in the non-volatile memory 141 of the communication module 140 and the unique information included in the mounted SIM card match. Consequently, the information processing device 100 can disable use of the information processing device when the communication module 140 is exchanged and, consequently, prevent misuse outside remote management and improve security.

Further, the information processing device 100 according to the present embodiment further registers a PIN which is a security code set to the SIM card, to the preregistered information memory unit 150. Furthermore, the information processing device 100 automatically inputs in the SIM card the PIN registered in the preregistered information memory unit 150, compares the PIN set to the mounted SIM card and the PIN registered in the preregistered information memory unit 150 and decides whether or not both of the PINs match. Consequently, the information processing device 100 can automatically read the unique information from the SIM card to which the PIN is set.

In addition, the information processing device 100 can also be realized by mounting each function of the information processing device 100 on an information processing device such as a known personal computer, work station, mobile telephone, PHS terminal, mobile communication terminal or PDA.

Figure 11:
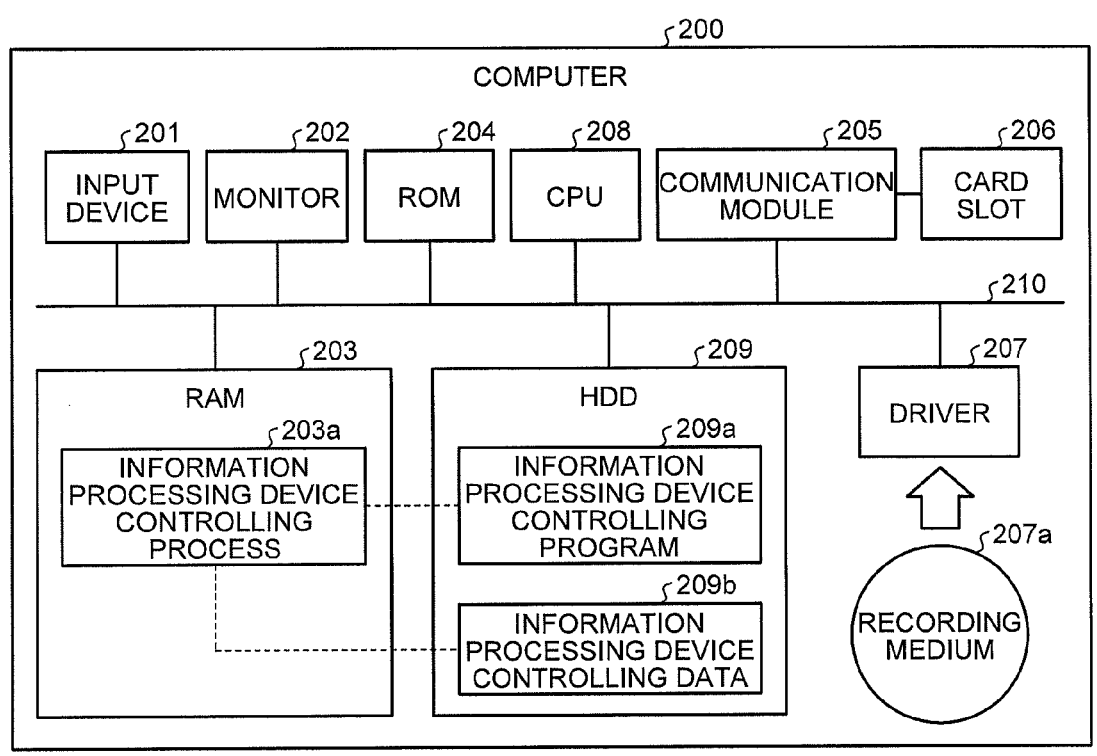
FIG. 11 is a view illustrating a hardware configuration of a computer configuring the information processing device according to the present embodiment.

FIG. 11 is a view illustrating a hardware configuration of a computer configuring the information processing device according to the present embodiment. A computer 200 illustrated in FIG. 11 has an input device 201, a monitor 202, a RAM (Random Access Memory) 203 and a ROM 204. Further, the computer 200 has a communication module 205 which performs wireless communication with another device through a wireless communication network, a card slot 206 to which a SIM card is mounted, and a driver 207 which reads, for example, a program from a recording medium 207a. Furthermore, the computer 200 has a CPU (Central Processing Unit) 208 and a HDD 209. Still further, each of the devices 201 to 205 and 207 to 209 is connected to a bus 210. The card slot 206 is connected to the communication module 205.

Further, in the HDD 209, an information processing device controlling program 209a which exhibits the same function as the function of the above information processing device 100, and an information processing device controlling data 209b are stored. In addition, this information processing device controlling program 209a may be adequately dispersed, and stored in a memory unit of another computer connected to be able to communicate through a network.

Further, when the CPU 208 reads the information processing device controlling program 209a from the HDD 209 and expands the information processing device controlling program 209a on the RAM 203, the information processing device controlling program 209a functions as information processing device controlling process 203a. That is, the information processing device controlling process 203a reads, for example, the information processing device controlling data 209b from the HDD 209, expands the information processing device controlling data 209b on an area of the RAM 203 allocated to the information processing device controlling process 203a, and executes various processings based on, for example, this expanded data. In addition, the information processing device controlling process 203a corresponds to the acquiring unit 161, the registering unit 162, the deciding unit 163 and the activation controlling unit 164 in FIG. 2.

In addition, the above information processing device controlling program 209a needs not necessarily be stored in the HDD 209, and executed when the computer 200 reads a program recorded in the recording medium 207a. Meanwhile, the recording medium 207a is a portable physical medium such as a flexible disk (FD), a CR-DOM, a DVD disk, a magnetooptical disk or an IC card to be inserted to the computer 200. Further, this program may be stored in, for example, a public network, Internet, a LAN (Local Area Network) or a WAN (Wide Area Network), and read by the computer 200 from these networks and executed.

According to an aspect of the information processing device disclosed in the present application, there is provided an effect of preventing misuse outside remote management even when a communication module is exchanged and improving security.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
    a communication module that performs wireless communication with another device using unique information included in an electronic card;
    an acquiring unit that acquires the unique information included in the electronic card;
    a registering unit that registers the unique information acquired by the acquiring unit in a first memory unit and a second memory unit that is provided in the communication module;
    a deciding unit that decides whether or not the unique information registered in the first memory unit matches the unique information registered in the second memory unit and the unique information included in the electronic card, respectively; and
    an activation controlling unit that allows activation of the information processing device when the deciding unit decides that the unique information registered in the first memory unit matches the unique information registered in the second memory unit and the unique information included in the electronic card, respectively.

2. The information processing device according to claim 1, wherein:
    the acquiring unit further acquires a security code set to the electronic card;
    the registering unit further registers the security code acquired by the acquiring unit, in the first memory unit;
    the deciding unit further decides whether or not the security code set to the electronic card matches the security code registered in the first memory unit when deciding that the unique information registered in the first memory unit matches the unique information registered in the second memory unit, and decides whether or not the unique information registered in the first memory unit matches the unique information included in the electronic card when deciding that the security code set to the electronic card matches the security code registered in the first memory unit; and the activation controlling unit allows activation of the information processing device when the deciding unit decides that the unique information registered in the first memory unit matches the unique information registered in the second memory unit and the unique information included in the electronic card, respectively.

3. The information processing device according to claim 1, wherein the activation controlling unit disallows activation of the information processing device when the deciding unit decides that the unique information registered in the first memory unit does not match the unique information registered in the second memory unit or decides that the unique information registered in the first memory unit does not match the unique information included in the electronic card.

4. The information processing device according to claim 1, wherein the activation controlling unit erases data in the information processing device when the deciding unit decides that the unique information registered in the first memory unit does not match the unique information registered in the second memory unit or decides that the unique information registered in the first memory unit does not match the unique information included in the electronic card.

5. The information processing device according to claim 2, wherein the activation controlling unit disallows activation of the information processing device when the deciding unit decides that the unique information registered in the first memory unit does not match the unique information registered in the second memory unit, decides that the unique information registered in the first memory unit does not match the unique information included in the electronic card or decides that the security code set to the electronic card does not match the security code registered in the first memory unit.

6. The information processing device according to claim 2, wherein the activation controlling unit erases data in the information processing device when the deciding unit decides that the unique information registered in the first memory unit does not match the unique information registered in the second memory unit or decides that the unique information registered in the first memory unit does not match the unique information included in the electronic card.

7. An information processing device controlling method of an information processing device that comprises a communication module that performs wireless communication with another device using unique information included in an electronic card, the information processing device controlling method comprising:

acquiring the unique information included in the electronic card;

registering the acquired unique information in advance in a first memory unit and a second memory unit that is provided to the communication module;

deciding whether or not the unique information registered in the first memory unit matches the unique information registered in the second memory unit and the unique information included in the electronic card, respectively when power is activated; and allowing activation of the information processing device when deciding that the unique information registered in the first memory unit matches the unique information registered in the second memory unit and the unique information included in the electronic card, respectively.

8. A non-transitory computer-readable recording medium having stored therein an information processing device controlling program for causing a computer that comprises a communication module that performs wireless communication with another device using unique information included in an electronic card to execute a process comprising:

acquiring the unique information included in the electronic card;

registering the acquired unique information in advance in a first memory unit and a second memory unit that is provided to the communication module;

deciding whether or not the unique information registered in the first memory unit matches the unique information registered in the second memory unit and the unique information included in the electronic card, respectively when power is activated; and allowing activation of the information processing device when deciding that the unique information registered in the first memory unit matches the unique information registered in the second memory unit and the unique information included in the electronic card, respectively.

* * * * *